(12) United States Patent
Sonneborn (10) Patent No.: US 8,939,394 B1
(45) Date of Patent: Jan. 27, 2015

(54) ANEMOMETER DRIVE APPARATUS AND METHOD

(75) Inventor: Walter Gerd Oskar Sonneborn, Colleyville, TX (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 394 days.

(21) Appl. No.: 13/199,677

(22) Filed: Sep. 7, 2011

Related U.S. Application Data (60) Provisional application No. 61/381,347, filed on Sep. 9, 2010, provisional application No. 61/403,136, filed on Sep. 9, 2010, provisional application No. 61/429,282, filed on Jan. 3, 2011, provisional application No. 61/429,289, filed on Jan. 3, 2011, provisional application No. 61/499,996, filed on Jun. 22, 2011.

(51) Int. Cl.
*B64C 27/02* (2006.01)
*B64C 27/72* (2006.01)
*B64C 27/615* (2006.01)

(52) U.S. Cl.
CPC ............... *B64C 27/02* (2013.01); *B64C 27/72* (2013.01); *B64C 27/615* (2013.01); *B64C 2027/7261* (2013.01)
USPC .......................... 244/17.11; 244/8; 244/215

(58) Field of Classification Search
USPC ...... 244/6, 7 R, 7 A, 211, 212, 213, 215, 216, 244/217, 17.11; 416/23, 24
See application file for complete search history.

(56) References Cited

U.S. PATENT DOCUMENTS

| | | | | |
|---|---|---|---|---|
| 2,279,615 A * | 4/1942 | Bugatti | ......................... | 244/217 |
| 2,601,463 A | 6/1952 | Stanley | | |
| 2,612,329 A * | 9/1952 | Crandall et al. | .............. | 244/217 |
| 3,494,424 A | 2/1970 | Stanley | | |
| 4,589,611 A | 5/1986 | Ramme et al. | | |
| 5,655,737 A * | 8/1997 | Williams et al. | .............. | 244/212 |
| 5,788,181 A * | 8/1998 | Wilson | .......................... | 244/7 A |
| 5,934,873 A | 8/1999 | Greene | | |
| 6,079,672 A * | 6/2000 | Lam et al. | ..................... | 244/217 |
| 6,276,641 B1 * | 8/2001 | Gruenewald et al. | ......... | 244/213 |
| 6,554,229 B1 * | 4/2003 | Lam et al. | ..................... | 244/217 |
| 6,669,137 B1 * | 12/2003 | Chen | ............................. | 244/7 R |
| 7,147,182 B1 | 12/2006 | Flanigan | | |
| 7,210,651 B2 * | 5/2007 | Scott | ........................... | 244/17.13 |
| 7,837,141 B2 * | 11/2010 | Kennedy et al. | .............. | 244/7 A |
| 2006/0273220 A1 * | 12/2006 | Scott | .......................... | 244/17.13 |
| 2009/0206208 A1 * | 8/2009 | Kennedy et al. | .............. | 244/7 A |
| 2011/0135472 A1 * | 6/2011 | Cazals et al. | ..................... | 416/23 |

* cited by examiner

*Primary Examiner* — Joseph W Sanderson
(74) *Attorney, Agent, or Firm* — Pate Baird, PLLC (57) ABSTRACT

A combined fixed and rotary wing aircraft may operate in vertical takeoff mode relying on the rotary wing, exclusively, and may completely change over to flight support by the fixed wing at higher advance ratios. Advance ratios may exceed not only the typical advance ratios of less than 0.5 but may exceed 1, and may even exceed 2. At the higher advance ratios, the rotary wing may be completely unloaded, the aircraft relying on the fixed wing for vertical support and airfoil lift. To maintain stability in the rotary wing, configuration, autorotation must continue. To power autorotation, without presenting a large area and drag, an anemometer-type flap system may selectively open and close to increase drag on the retreating blades, and provide minimum drag on the advancing blades.

11 Claims, 7 Drawing Sheets

ANEMOMETER DRIVE APPARATUS AND METHOD

RELATED APPLICATIONS

This application claims the benefit of U.S. Provisional Patent Application Ser. No. 61/381,347, filed on Sep. 9, 2010, U.S. Provisional Patent Application Ser. No. 61/403,136, filed on Sep. 9, 2010, U.S. Provisional Patent Application Ser. No. 61/429,282, filed on Jan. 3, 2011, U.S. Provisional Patent Application Ser. No. 61/429,289, filed on Jan. 3, 2011, and U.S. Provisional Patent Application Ser. No. 61/499,996, filed on Jun. 22, 2011.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes a fuselage, housing an engine and passenger compartment, and a rotor, driven by the engine, to provide lift. Forced rotation of the rotor causes a reactive torque on the fuselage. Accordingly, conventional helicopters require either two counter rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotating wing aircraft provide the significant advantage of vertical takeoff and landing (VTOL), they are much more limited in their maximum flight speed than are fixed wing aircraft. The primary reason that prior rotating wing aircraft are unable to achieve high flight speed is a phenomenon known as "retreating blade stall." As the fuselage of the rotating wing aircraft moves in a flight direction, rotation of the rotor causes each blade thereof to be either "advancing" or "retreating."

That is, in a fixed-wing aircraft, all wings move forward in fixed relation, with the fuselage. In a rotary-wing aircraft, the fuselage moves forward with respect to the air. However, rotor blades on both sides move with respect to the fuselage. Thus, the velocity of any point on any blade is the velocity of that point, with respect to the fuselage, plus the velocity of the fuselage. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade. One technical solutions to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotating wing aircraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotating wing aircraft is the drag at the tips of the rotor. The tip of the advancing blade is moving at a speed equal to the speed of the aircraft and relative to the air, plus the speed of the tip of the blade with respect to the aircraft. That is equal to the sum of the flight speed of the rotating wing aircraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotating wing aircraft is reverse air flow over the retreating blade. As noted above, the retreating blade is traveling opposite the flight direction with respect to the fuselage. At certain high speeds, portions of the retreating blade are moving rearward, with respect to the fuselage, slower than the flight speed of the fuselage. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotating wing aircraft to the maximum air speed of the tips of the rotor blades is known as the "advance ratio. The maximum advance ratio of rotary wing aircraft available today is less than 0.5, which generally limits the top flight speed of rotary wing aircraft to less than 200 miles per hour (mph). For most helicopters, that maximum achievable advance ratio is between about 0.3 and 0.4.

In view of the foregoing, it would be an advancement in the art to provide a rotating wing aircraft capable of vertical takeoff and landing and flight speeds in excess of 200 mph.

A helicopter rotor can be operated at controlled rotational speeds by external airflows only. For example, without the additional power added to the shaft rotating the rotor blades, the rotor blades or rotary wings can autorotate, operating like a windmill. However, autogyros typically, a helicopter uses a power rotor, which therefor has the rearward portion of its operating disk (the theoretical plane in which the blades rotate) upward, with the front portion relatively downward in order to both lift the aircraft up and draw it forward. In contrast, autogyros typically operate with the rotor disk in opposite configuration with the upper front edge relatively higher and the trailing edge of the rotor disk relatively lower in order that relative airflow past the rotor tends to windmill or autorotate the rotor. Thus, the rotary wing provides both windmill autorotation to rotate itself, as well as providing the Bernoulli effect of lift over the airfoil shape of each rotor blade. Thus, at least a portion of the blade or airfoil is dedicated to or responsible for providing autorotation, and at least a portion of the blade is providing airfoil lifting force. Therefore, in an autogyro, forward propulsion is provided typically by a propellor or other device separate from the rotary wing. In contrast, helicopters provide both forward propulsion and lift through the rotary wing.

While rotor speed control at advanced ratios substantially below 1 is straightforward with conventional rotor controls, as the aircraft speed increases, the retreating blades are increasingly exposed to the relative airspeed of the vehicle fuselage. At an advance ratio of 1, the tip speed, the relative velocity of the retreating rotor blade at its extreme end is effectively stationary. That is, for example, the fuselage is traveling forward at a velocity, into the air, while the retreating blade tip is rotating in the opposite direction, at the same speed relative to the aircraft fuselage. Accordingly, the blade tip is effectively stationary. At advance ratios greater than 1, the relative airspeed of the fuselage is such that the trailing edge of the retreating blade is actually exposed to airflow in a reverse direction, that is, from trailing edge toward leading edge.

It would be an advantage to provide some additional, even a relatively small value, of controllable power in order to maintain desired rotor speed at all times. For example, increased lift, typically comes from a combination of collective pitch or the blade angle of attack and a control plane angle of attack. The direction for increasing lift is a function of collective pitch for a rotor trimmed to 0 flapping motion begins to reverse at an advance ratio of 1. The amount of flapping per degree of control angle of attack becomes extremely sensitive above advance ratios of 1. Thus, control may be particularly sensitive at advance ratios that are substantially higher than 1, if the rotor is to be kept in autorotation.

There is a substantial contribution to drag resulting when a rotor is driven in conventional autorotating mode. Therefore, it would be an advantage at higher speeds, particularly where a fixed wing portion of an aircraft may be more effective as a lift mechanism, to still maintain the rotor blades in autorotation at a sufficient speed or angular velocity to maintain their stiffness due to centrifugal forces. Therefore, it would be an advance in the art to provide some mechanism whereby additional autorotating force may be applied to a rotary wing, specifically to an autogyro or autorotating wing, without substantially increasing drag on the aircraft or on the wing, and without increasing fuel consumption, such as would result from powering the rotor or the like.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In accordance with the foregoing, an apparatus and method are devised to provide a fully unloaded rotor operating in a high forward speed and advance ratios greater than 1, and particularly much greater than 1, with autorotating power. In certain embodiments, a rotor is unloaded by a fixed wing of an aircraft. Thus, the aircraft may have a rotary wing and a fixed wing.

The fixed wing may be optimized for high speed cruise condition, and thus can be extremely efficient from an energy and lift point of view, with minimum drag. With the rotor fully unloaded, it is not easily possible to maintain conventional autorotation. In fact, with the blade operating completely flat, with no lift, then the angle of attack of the rotor disk, which requires air flow in order to maintain autorotation, would be unavailable to drive rotation.

Accordingly, a variable geometry device may be located near the tip of each blade. The device may be configured to exhibit substantially no additional drag over the baseline airfoil. That is, a matched set of flaps may be formed at or near the trailing edge, and near the tip of each blade. These flaps may be sized to close, forming a conventional trailing edge under circumstances under which the rotor blade is advancing into the airstream with the aircraft.

However, when the blade is on the retreating side of the mast, the flaps may be opened by suitable actuators, thus greatly increasing their drag, and providing force and resulting torque, rotating the blade in the desired direction of rotation. Once the blade has reached an advancing position in which the flow is once again positive, that is the flow is passing from the leading edge to the trailing edge, the flaps may be closed. The flaps thereby provide the typical, decreasing thickness of the blade or rotary wing, ending with a very narrow trailing edge.

In certain embodiments, the flap system may be operated to move both upper and lower flap portions simultaneously to a downward position. In such a configuration, the two flap portions act as a flap, such as in a conventional aircraft. The flap becomes a single large extension to the wing of an aircraft, thereby creating high drag with high lift, when needed. For example, moving the upper and lower portions of the flap in closed mode, and both in the same direction would change the camber of the airfoil. This may be used to transform the rotor into a smart rotor in which the camber control device may be used to reduce vibration, enhance performance in the flight regimes where the rotor is being operated in conventional autorotation, or the like.

In general, maximum fluid drag occurs when an open cavity is presented into an oncoming airstream. Less drag occurs when the frontal or convex aspect is presented to the incoming air, leaving the concave aspect in a trailing position. The minimum drag occurs when the leading edge is closed, and the trailing edge is closed, coming to a gradual close in order to improve boundary layer effects and minimize drag.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

Figure 1:
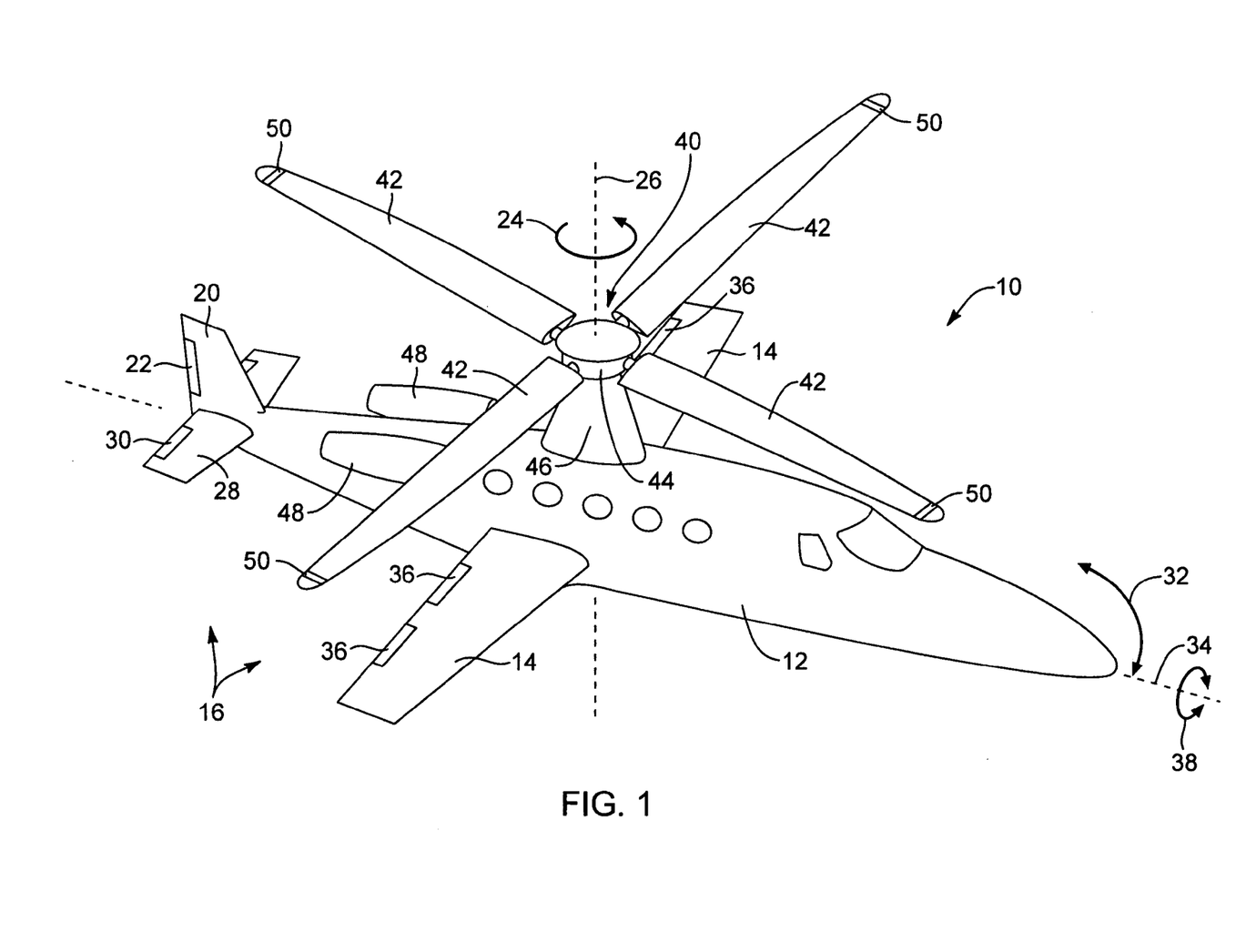
FIG. 1 is an isometric view of an aircraft in accordance with an embodiment of the present invention.

Referring to FIG. 1, an aircraft 10 includes a fuselage 12 defining a cabin for carrying an operator, passengers, cargo, or the like. The fuselage 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the fuselage 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the fuselage of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the fuselage 12. The rotor 40 may be selectively powered by one or more engines 48 housed in the fuselage 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
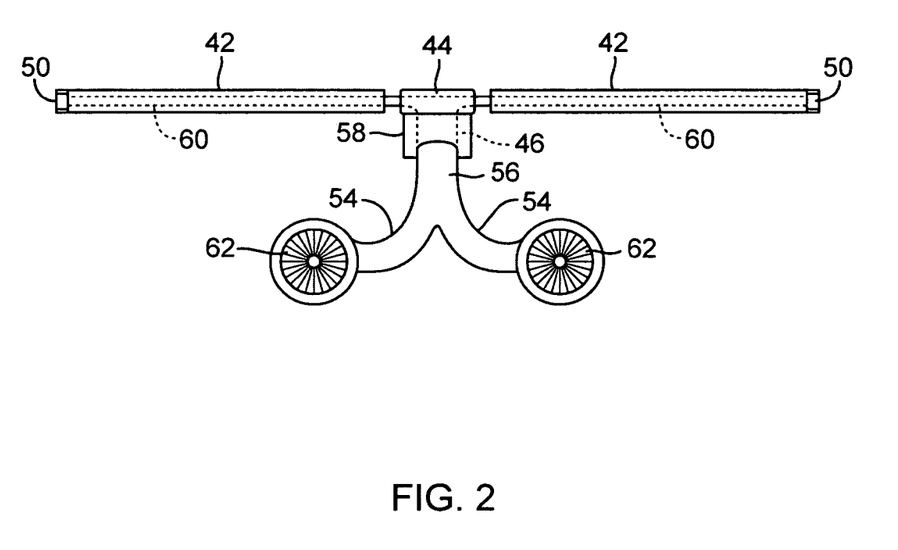
FIG. 2 is a front elevation view of a compressed or otherwise pressurized air supply for a tip jet in accordance with an embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
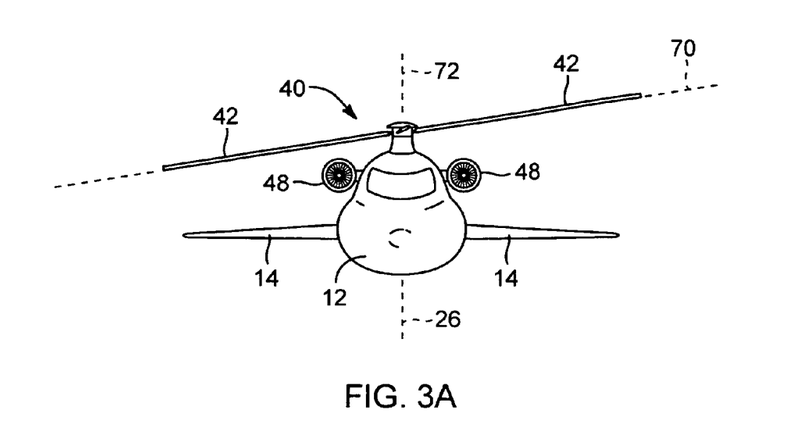
FIG. 3A is a front elevation view of a rotorcraft illustrating operational parameters describing a rotor configuration suitable for use in accordance with embodiments of an apparatus and method in accordance with the present invention and the system of FIGS. 1 and 2 in particular.
Figure 3B:
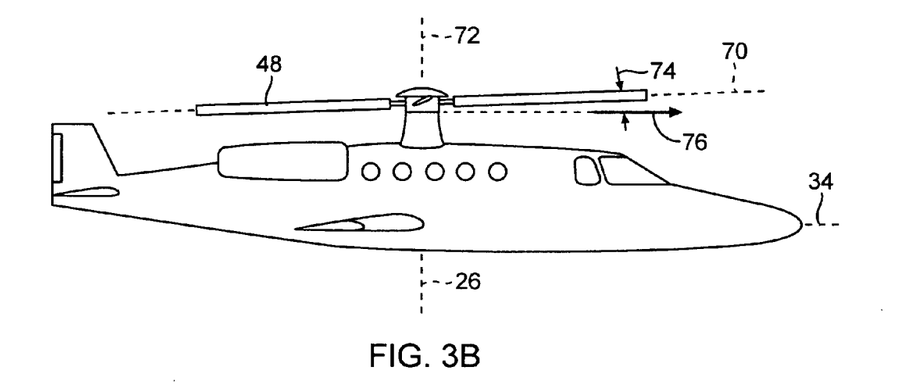
FIG. 3B is a right side elevation view of the rotorcraft of FIG. 3A.
Figure 3C:
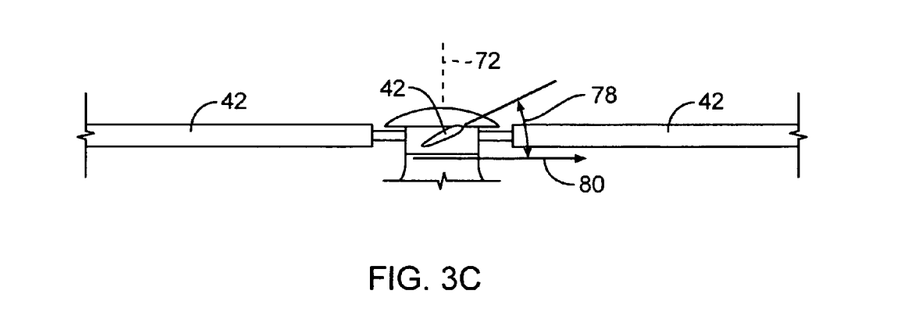
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the fuselage 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. the pitch angle 78 of the blade 42 may be controlled by both cyclic and collective pitch control as known in the art of rotary wing aircraft design.

Figure 4:
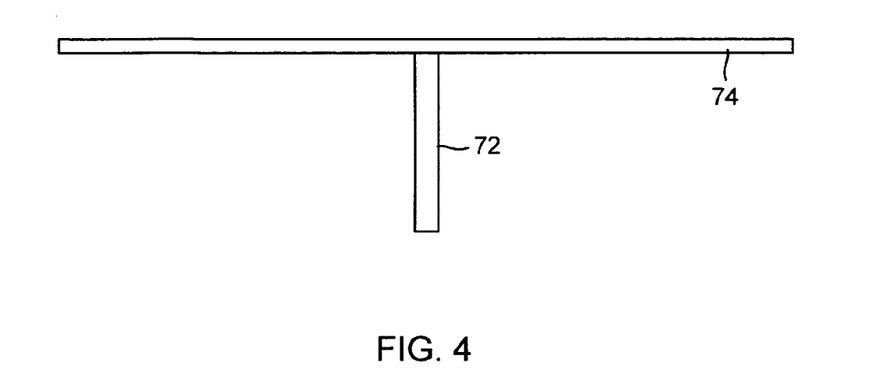
FIG. 4 is a front elevation view, schematically rendered, of a rotor blade on a mast.
Figure 5:
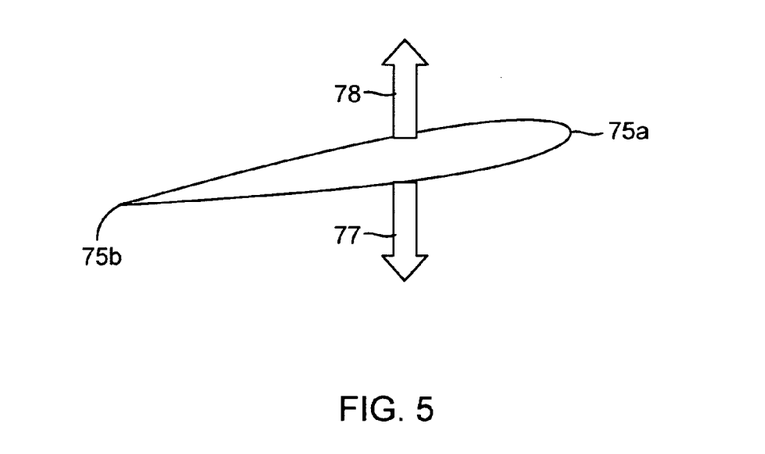
FIG. 5 is an end cross-sectional view of an airfoil such as may be used in the rotor system of FIG. 4.

Referring to FIGS. 4 and 5, while continuing to refer generally to FIGS. 1-11, a system for autorotation may include a rotor system 70 having a mast 72 about which, or with which, rotor blades 74 rotate. Each of the blades 74 may have a leading edge 75a and trailing edge 75b, on an airfoil 76 or wing 76 portion. For example, a blade 74 may include various attachment mechanisms, individual blade pitch controls, and so forth. Ultimately, however, the autorotating of the blades 74 depends on the airfoil 76, a portion of which operates as a windmill.

Moreover, the aircraft load 77 or weight 77 of the fuselage and cargo of an aircraft must be opposed by a lift force 78, commonly simply referred to as lift 78. Accordingly, the airfoil 76 operates according to the Bernoulli principles. Thus, in flight, the load 77 or weight 77 represented by an aircraft must be opposed by the lift 78 provided by the wings 76 or the rotor blades 74.

In one embodiment of an aircraft in accordance with the invention, the aircraft may be augmented with fixed wings that provide lift in a more aerodynamic and efficient manner at high speeds, and particularly at high advance ratios. In such an embodiment, the rotor system 70 may actually be unloaded such that it does not provide any substantial lift. One benefit for the rotor system 70 not providing lift is that the drag that would have to be sustained in order to provide lift may be eliminated. Thus, the blades 74 may be turned to be effectively flat, and not supporting any of the load 77. However, in order to maintain autorotation in such an embodiment, a drive system 80 is needed to maintain rotation.

In accordance with the invention, a drive system 80 may include a top flap 82 and a bottom flap 84. The top flap and bottom flap may extend along as much of the length of the blades 74 as is necessary to provide sufficient area to provide the autorotating power to drive the blades 74 in autorotation. Thus, the top flap 82 and bottom flap 84 may be a matched set that selectively move between closed positions 86, 88, respectively, in which the two flaps 82, 84 provide a suitable trailing edge 75b for the airfoil 76.

Thus, in the closed position 86, the top flap 82 is in contact with the bottom flap 84, also in its closed position 88. More correctly, these closed positions 86,88 may be thought of as the closed, camber-neutral positions. For example, each of the top flap 82 and the bottom flap 84 may conceivably be moved in the same direction, and come to a position of closure adding camber to the airfoil 76.

Figure 6:
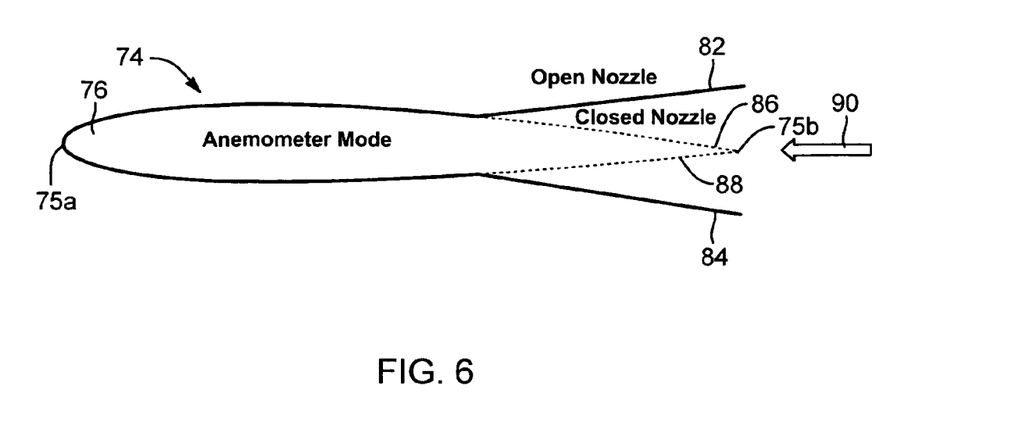
FIG. 6 is an end, cross-sectional elevation view of the airfoil of FIG. 5, illustrating the position of the flap system in an open position, and designating by dotted lines, the closed position thereof.
Figure 7:
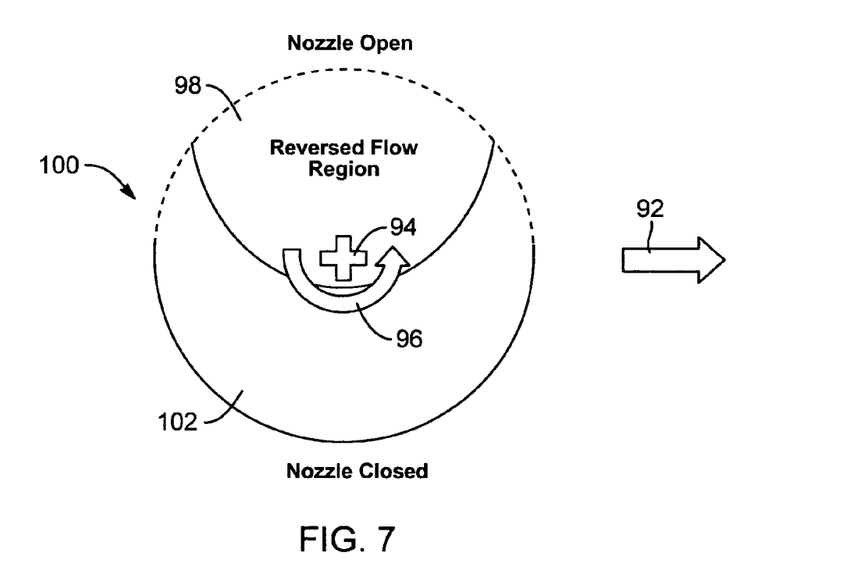
FIG. 7 is a top plan view, schematically rendered, of a rotor disk for a rotor system of FIG. 4, illustrating the direction of flight, the direction of rotation of the rotary wing, and the resulting positive and reversed flow regions experienced by the rotor.
Figure 8:
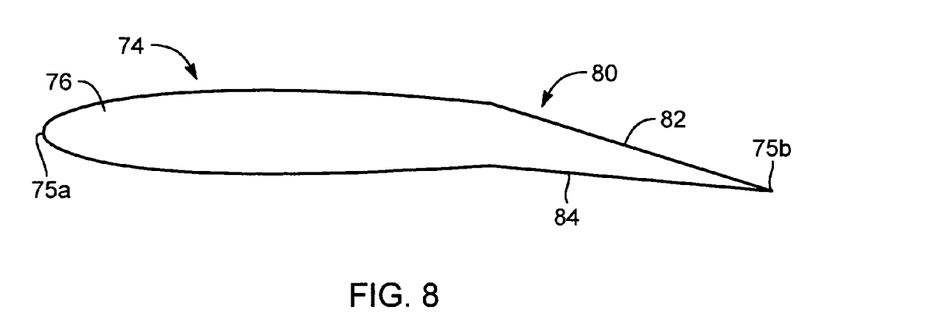
FIG. 8 is an end, cross-sectional, elevation view of the airfoil of FIGS. 4-7, with the upper and lower flaps of the flap system both positioned to move in the same direction, and thus modify the camber of the airfoil.

Referring to FIGS. 6 and 7, while continuing to refer to FIGS. 4-5 and to FIGS. 1-11 generally, a drive system 80 on an airfoil 76 of a blade 74 of a rotor system 70 may encounter a reverse direction 90 of airflow. This is explained hereinabove with respect to retreating blades 74 at high advance ratios.

The direction 92 of flight of an aircraft may be thought of as moving into still air, relative velocity rendering it an airstream. Accordingly, the direction of flight 92 results in certain anomalies with respect to the shape of the airfoil 76. In general, the direction of airflow 90 is reversed when the aircraft is traveling at a suitable speed in the direction of flight 92, and the rotation of the blade 74 or blades 74 that are on the retreating side, moving in the reverse flow direction 90 are moving at a speed that is effectively less than the speed in the direction 92 of flight. In such an environment, a retreating blade experiences a reversed flow direction 90 in which incoming airflow passes from the trailing edge 75b toward the leading edge 75a.

In flight, an autorotating aircraft has a rotor system 70 that rotates the blade 74 about an axis 94 of rotation. Typically, for the descriptions herein, the direction 96 of rotation of the blades 74 will be counterclockwise as illustrated. In this configuration, a region 98 of reversed flow exists, for any trailing edge 75b or any portion thereof along the length of the blade 74 at which the net forward speed in the direction of flight 92 exceeds the retreating speed of that portion of the plane in the reverse direction 90. Thus, the shape of the reverse flow region 98 varies somewhat with the speed of the aircraft in the direction of flight 92, and the net linear speed of a trailing edge 75b of a blade 74 opposite thereto.

The rotor disk 100 represents the sweep 100 of the blade 74 of a rotor system 70. Accordingly, the region 102 of positive flow or positive leading edge flow may be thought of as the conventional experience of a blade 74, or the airfoil 76 of such a blade 74, advancing into the airstream by its leading edge first.

However, the region 98 represents that portion where the trailing edge of a retreating blade 74 is first to encounter the airstream, and the flow is in the reverse direction 90. Thus, actuators operating to pivot the flaps 82, 84 about their respective pivots 104, may alter the effective drag near the trailing edge 75b of the airfoil 76.

Referring to FIGS. 8-11, in one embodiment, the flaps 82, 84 may act in concert both moving in the same direction. For example, in FIG. 8, both the flaps 82, 84 are positioned in a downward orientation. Accordingly, the camber provides more lift, and more drag. Likewise, the upper 82 and the lower flap 84 may be positioned both in the upper position in order to provide an opposite effect.

Figure 9:
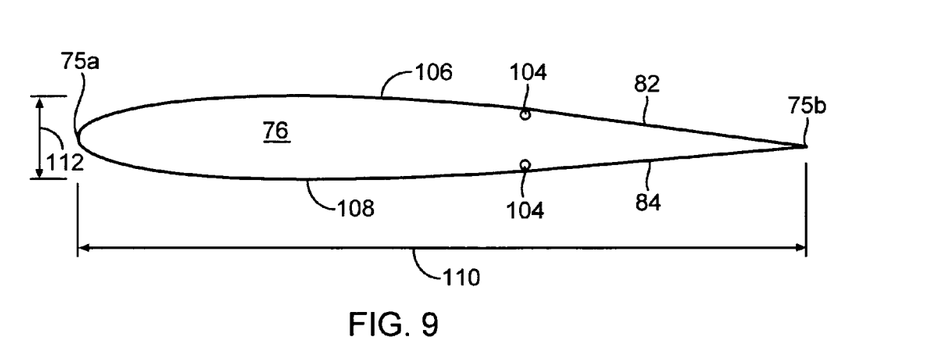
FIG. 9 is an end, cross-sectional view of the airfoil of FIG. 8, having the flaps in the closed and camber-neutral position.
Figure 10:
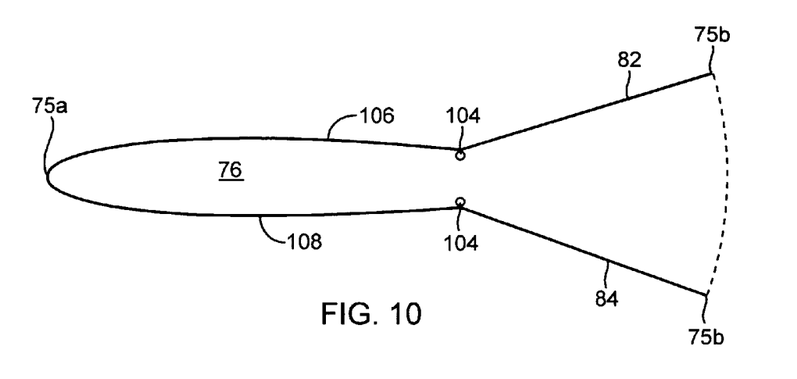
FIG. 10 is an end, cross-sectional, elevation view of the airfoil of FIGS. 8-9 having the upper flap in the raised position and the lower flap in the lowered position, thus maximizing drag during reverse flow conditions, in order to provide additional auto rotating force.
Figure 11:
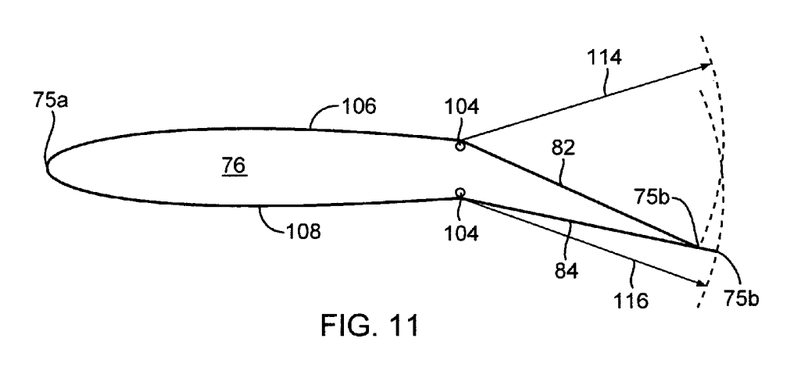
FIG. 11 is an end, cross-sectional, elevation view of the airfoil of FIGS. 8-10, showing the difference in axis of rotation and the resulting circumference of the radius of the trailing edge of each flap portion, in a camber-controlled condition with both flap portions deflecting downward.

Referring to FIGS. 9-11, in general, an upper surface 106 and lower surface 108 of an airfoil 76 may define a chord 110 or effective airfoil length 110. Similarly, the relative thickness 112 of the airfoil 74 will have a direct effect on drag. The chord 110 and thickness 112 may be designed according to suitable practice as engineered in the art.

Meanwhile, implementation of the pivots 104 in which the flaps 82, 84 pivot results in respective radii 114, 116 for the two flaps 82, 84. Thus, the trailing edge 75b of each of the flaps 82, 84 need not necessarily align. In the camber position of FIG. 11, a slight mismatch in the contact area would result in the trailing edge 75b on the lower flap 84 representing the actual final trailing edge of the airfoil 76. Where the camber is reversed, then the trailing edge 75b of the upper flap 82 would represent the trailing edge of the airfoil 76.

Meanwhile, the configuration of FIG. 9 represents a camber-neutral configuration of the airfoil 76. The configuration of FIG. 10 represents the maximum drag position in the reverse flow direction 90. Here, the trailing edges 75b of the upper 82 and lower flap 84 are opened in opposite directions in order to maximize drag on the retreating blade 74 in reverse flow. Thus, maximum power is imparted to the blades 74 of the rotor system 70 by the reverse air flow 90.

Some of the benefits of the system are that upon rotation into the region 102 of positive edge flow, the flaps 82, 84 may be moved to the camber neutral position of FIG. 9, and thus minimize drag of the airfoil 76 advancing into the air in the direction 92 of flight. Thus, during a rotation, the operation of the upper flap 82 and lower flap 84 may be optimized in order to provide the appropriate drag for autorotative loading on retreating blades 74 power, and the appropriate, minimized drag on the advancing blades 74 of the rotor system 70.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
    providing an aircraft comprising
        a fuselage defining a longitudinal axis extending fore and aft, a lateral axis extending orthogonally therefrom, and a transverse axis orthogonal to the longitudinal and lateral axes and extending substantially vertically,
        an engine, having a throttle configured to advance to increase power output thereof and to retreat to decrease power output thereof,
        a rotary wing, connected to the fuselage and sized to fully support the weight of the aircraft at takeoff,
        the rotary wing, operable to reduce drag thereof at an advance ratio of at least one by effecting a reduction of lift therefrom to less than the force required to support the aircraft in flight, and
        the rotary wing further comprising a flap system having upper and lower flaps, the upper flap pivotable between an up position and a neutral position therebelow, the lower flap being pivotable between a down position and a neutral position thereabove;
    providing autorotating power to the rotary wing by selectively controlling the flap system to move the first and second flaps between a high drag position, in which the upper flap is in the up position and the lower flap is in the down position, and a low drag position in which each of the upper and lower flaps is in the neutral position corresponding thereto.

2. The method of claim 1, further comprising changing the camber of the rotary wing by at least one of pivoting the upper flap to a down position thereof, below the neutral position thereof, and pivoting the lower flap to an up position thereof, above the neutral position thereof.

3. The method of claim 1, wherein the aircraft further comprises a controller configured to pivot each of the upper and lower flaps to the neutral position corresponding thereto when the aircraft is moving at an advance ratio placing the flap system in a positive airflow.

4. The method of claim 1, wherein the aircraft further comprises a controller configured to pivot each of the upper and lower flaps to the neutral position corresponding thereto, when the aircraft is moving at an advance ratio placing the flap system in a reverse airflow.

5. The method of claim 1, wherein the aircraft further comprises a controller configured to pivot each of the upper and lower flaps to the neutral position corresponding thereto, when the collective pitch of the rotary wing is set at a value providing insufficient autorotation to maintain dynamic stability of the rotary wing.

6. The method of claim 1, wherein the aircraft further comprises a controller configured to pivot each of the upper and lower flaps to the neutral position corresponding thereto, when the aircraft is moving at an advance ratio that requires substantially no contribution to lift by the rotary wing.

7. The method of claim 1, further comprising:
    pivoting each of the upper and lower flaps to the neutral position corresponding thereto, when the aircraft is moving at an advance ratio placing the flap system in a reverse airflow and a condition exists that is selected from
        the collective pitch of the rotary wing being set at a value providing insufficient autorotation to maintain dynamic stability of the rotary wing, and
        the aircraft moving at an advance ratio that requires substantially no contribution to lift by the rotary wing.

8. The method of claim 1, further comprising pivoting each of the upper and lower flaps to the neutral position corresponding thereto, when the collective pitch of the rotary wing is set at a value providing insufficient autorotation to maintain dynamic stability of the rotary wing.

9. The method of claim 1, further comprising pivoting each of the upper and lower flaps to the neutral position corresponding thereto, when the aircraft is moving at an advance ratio that requires substantially no contribution to lift by the rotary wing.

10. The method of claim 9, wherein the advance ratio is greater than 1.

11. The method of claim 10, wherein the advance ratio is greater than 2.

* * * * *